United States Patent [19]

Iwai et al.

[11] 3,933,720

[45] Jan. 20, 1976

[54] POLYCHLOROPRENE TYPE ADHESIVE COMPOSITIONS

[75] Inventors: Sakuya Iwai, Tokyo; Takao Hirose, Kamakura, both of Japan

[73] Assignee: Nippon Oil Company Ltd., Tokyo, Japan

[22] Filed: Apr. 2, 1974

[21] Appl. No.: 457,276

[30] Foreign Application Priority Data
Apr. 7, 1973 Japan.................................. 48-39146

[52] U.S. Cl................... 260/31.2 MR; 260/33.6 A; 260/33.8 UA; 260/42.34; 260/45.9 R; 260/45.95; 260/78.4 D; 260/829; 260/845; 260/888; 260/889; 260/890
[51] Int. Cl.².... C08K 5/01; C08K 5/02; C08K 5/09
[58] Field of Search ...... 260/888, 829, 78.4 D, 892, 260/31.2 MR, 33.6 A, 33.8 UA, 890

[56] References Cited
UNITED STATES PATENTS

| | | | |
|---|---|---|---|
| 2,388,346 | 11/1945 | Soday | 260/888 |
| 2,926,718 | 3/1960 | Baldwin | 260/888 |
| 2,947,710 | 8/1960 | Frantz | 260/829 |
| 2,993,880 | 7/1961 | Aldridge | 260/78.4 D |
| 3,070,570 | 12/1962 | Gessler | 260/829 |
| 3,093,601 | 6/1963 | Gessler | 260/888 |
| 3,775,381 | 11/1973 | Hayashi | 260/78.4 D |

*Primary Examiner*—Carman J. Seccuro
*Attorney, Agent, or Firm*—Frank J. Jordan

[57] ABSTRACT

Polychloroprene type adhesive compositions comprising (1) an acid-modified hydrocarbon resin, (2) polychloroprene, and (3) suitable additives such as metal oxides and anti-aging agents, together with, if desired, (4) known resins for polychloroprene type adhesives, such as alkylphenol resins and petroleum resins, and (5) a volatile organic solvent.

10 Claims, No Drawings

POLYCHLOROPRENE TYPE ADHESIVE COMPOSITIONS

This invention relates to a novel polychloroprene type adhesive composition. More particularly, it relates to a novel polychloroprene type adhesive composition comprising (1) a resin prepared by reacting a starting hydrocarbon resin-obtained by the polymerization of a cracked oil fraction that has itself been obtained by the pyrolysis, steam cracking, catalytic cracking or the like of petroleum - with an unsaturated polybasic acid or anhydride thereof, (2) polychloroprene and (3) additives such as a metal oxide and/or an anti-aging agent, which are usually added to polychloroprene, and, if desired, further comprising (4) supplemental resins such as an alkylphenol resin, cumarone-indene resin and petroleum resin, which may be usually incorporated in a polychloroprene type adhesive, and (5) a volatile organic solvent.

In general, polychloroprene type adhesives are excellent in adhesiveness, weather resistance, aging resistance, chemical resistance and the like, and they have heretofore been widely used for various purposes.

The conventional polychloroprene type adhesives exhibit excellent adhesive strength at ambient temperatures but, on the other hand, tend to considerably decrease in adhesiveness in summer or when used at high temperatures. Thus they present the problem of their exhibiting considerable to which they are necessarily exposed while in use. Thus they have such a problem as their considerable decrease in adhesiveness at high temperatures, that is unsatisfactory heat resistance. While it is already known that certain alkylphenol resins are effective as reinforcements to reduce the aforesaid drawbacks and that conventional polychloroprene type adhesives can be improved in heat resistance by the use of alkylphenol resins and derivatives thereof that are contained in the adhesives.

However, these alkylphenol resins are expensive and, therefore, new heat-resistant polychloroprene adhesives, in which relatively inexpensive component materials are used have been sought.

The primary object of this invention is therefore to provide a polychloroprene adhesive composition which retains satisfactory heat resistance properties and contains a resin quite different in properties from alkylphenol resins.

This object is attained by the preparation of a heat-resistant adhesive composition comprising (1) an acid-modified resin prepared by reacting an unsaturated polybasic acid or anhydride thereof with a starting hydrocarbon resin obtained by the polymerization of a cracked oil fraction that itself can be obtained as a by-product in the production of ethylene, propylene, butenes and butadiene by the so-called steam cracking, vapor-phase pyrolysis, sand cracking, catalytic pyrolysis or the like of such petroleum fractions or products such as naphtha, kerosene, light oil (gas oil), crude petroleum or the like, (2) polychloroprene and (3) conventional additives such as metal oxides and/or anti-aging agents, which are usually added to polychloroprene, together with, if desired, (4) supplemental resins such as alkylphenol resin, cumarone-indene resin, petroleum resin and terpene resin, which may be incorporated in polychloroprene type adhesives and (5) a volatile organic solvent.

The term "petroleum" used herein is intended to include naphtha, kerosene, gas oil, crude oil or the like.

The starting resin for the acid-modified resin (1) used as one of the component materials in this invention is obtained by the polymerization of a cracked oil fraction obtained by the pyrolysis of naphtha or the like, as mentioned above. Industrially, the polymerization is carried out by using, as a starting resin material, a fraction boiling at 140° - 280°C, or such a fraction containing indene in an increased concentration obtained from said cracked oil fraction in the presence of a Friedel-Crafts type catalyst, and the resin thus obtained is the most preferred one of this invention. There may also be used such resins as are obtained by the polymerization of a fraction boiling at 20° - 140°C separated from said cracked oil fraction or of a mixture of the former fraction with said fraction boiling at 140° - 280°C. The starting resin so obtained, after having been melted by heating or dissolved in a hydrocarbon oil or other solvents, is then addition reacted with an unsaturated polybasic acid such as maleic acid, or an unsaturated dicarboxylic anhydride such as maleic anhydride. The amount of said unsaturated polybasic acid or anhydride thereof that is added is preferably in the range of 0.1 - 30 parts based on 100 parts by weight of said starting hydrocarbon resin. A mixture of such a hydrocarbon resin and polybasic acid or anhydride thereof is preferably reacted at 120° - 250°C in the absence or presence of a catalyst such as a peroxide.

The typical unsaturated polybasic acids and anhydrides thereof which may be used in this invention include maleic, citraconic, endomethylenetetrahydrophthalic and tetrahydrophthalic acids and the anhydrides and halides thereof. These unsaturated dicarboxylic acids and the anhydrides thereof may be used singly or in any mixture.

The term "polychloroprene" used herein is defined as being a chloroprene polymer which may be a commercially available chloroprene polymer such as Neoprene (Trademark of Showa Neoprene Co., Ltd.), Denka Chloroprene (Trademark of Denki Kagaku Kogyo Co., Ltd.) or Skyprene (Trademark of Toyo Soda Kogyo Co., Ltd.).

The metal oxides which may be used include alkaline earth metal oxides such as magnesium oxide and calcium oxide, as well as zinc oxide.

The anti-aging agents which may be used include 2,6-ditertiary-butyl para-cresol, 2,2'-methylene bis(4-methyl-6-tertiary-butylphenol and phenyl-$\beta$-naphthylamine, which are usually used in polychloroprene rubber.

The volatile organic solvents which may be used include aromatic hydrocarbons such as toluene and xylene; chlorinated aliphatic hydrocarbons such as carbon tetrachloride; aliphatic hydrocarbons such as n-hexane; ethyl acetate; and mixtures thereof. Such solvents are those conventionally used to dissolve polychloroprene therein.

The aforesaid novel polychloroprene type adhesive compositions of this invention may be prepared by any known process, for example, a process disclosed in "Plastics, 23 (12) 107–120 (1972)".

The proportions of the components contained in the adhesive compositions of this invention are not particularly limited; however, the adhesive compositions usually comprise, by weight, 1 - 100 parts of the component (1), 100 parts of the component (2), 1 - 40 parts of the metal oxide and 0 - 5 parts of the anti-aging agent (3), 0 – 100 parts of the component (4) and 100 – 1000 parts of the component (5), and they preferably comprise 20 – 60 parts of the component (1), 100 parts of the component (2), 5 – 20 parts of the metal oxide and 1 – 3 parts of the anti-aging agent (3), 0 – 60 parts of the component (4) and 300 – 600 parts of the component (5).

This invention will be detailed by reference to the following non-limiting examples wherein all parts are by weight unless otherwise specified.

EXAMPLE 1

A cracked oil fraction boiling at 140° – 220°C produced as a by-product by the steam cracking of naphtha, was polymerized at 10°C for 5 hours in the presence of a catalyst comprising boron trifluoride ethyl ether complex compound, after which the reaction mixture was combined or admixed with an aqueous solution of sodium hydroxide to decompose the catalyst, thereafter washed with water and then treated to distil off the unreacted oils and low polymers to obtain an aromatic hydrocarbon resin (I) having a softening point of 122°C as determined from JIS (Japanese Industrial Standard) K2531. One hundred grams of the resin (I) were admixed with 10 g of maleic anhydride and the resulting mixture was reacted at 210°C for 5 hours, thereby resulting in a maleicmodified aromatic hydrocarbon resin (I-M).

EXAMPLE 2

A cracked oil fraction boiling at 160° – 225°C produced as a by-product by the steam-cracking of naphtha, was treated in the same manner as in Example 1 to obtain an aromatic hydrocarbon resin (II) having a softening point of 157°C. One hundred grams of the resin (II) were admixed with 6 g of maleic anhydride and the admixture reacted at 230°C for 9 hours, thereby resulting in a maleic-modified aromatic hydrocarbon resin (II-M).

EXAMPLE 3

A cracked oil fraction having a boiling point range of about 20° – 140°C obtained as a by-product by the steam-cracking of naphtha, was subjected to polymerization at ambient temperatures in the presence of an aluminum trichloride catalyst, and the resulting reaction mixture was treated in the same manner as in Example 1 to obtain an aliphatic hydrocarbon resin (III) having a softening point of 100°C. One hundred grams of the resin (III) were admixed with 7 g of maleic anhydride and the admixture reacted at 210°C for 5 hours, thereby resulting in maleic-modified aliphatic hydrocarbon resin (III-M).

EXAMPLE 4

The adhesive compositions of this invention were prepared as follows.

One hundred parts of polychloroprene (supplied under the trademark of Denkachloroprene A-90 by Denki Kagaku Kogyo Co., Ltd.), 5 parts of zinc oxide, 4 parts of magnesium oxide and 2 parts of an anti-aging agent (supplied under the trademark of Nocrac 200 by Ohuchi Shinko Kagaku Co., Ltd.) were kneaded together by the use of a mixing roll to form a kneaded composition.

Forty-five parts of each of the maleic-modified resins I-M, II-M and III-M obtained in Examples 1, 2 and 3, respectively, were mixed under thorough agitation with 4 parts of magnesium oxide and 1 part of water in 450 parts of toluene at room temperatures for 24 hours to form a mixture which was incorporated with 111 parts of said kneaded composition and then mixed together, thereby, resulting in a novel adhesive composition.

For comparison, the aforesaid procedure was followed except that the maleic-modified resin was substituted by each of the non-modified resins I, II and III obtained in Examples 1, 2 and 3, respectively, thereby to obtain a comparative adhesive composition. For further comparison, the aforesaid procedure was repeated with the exception that none of such resins as above was used, to obtain a comparative resin-free adhesive composition.

The adhesive compositions so obtained were tested for peel strength at room temperatures and at 60°C. The results are shown in Table 1, from which it is seen that the novel adhesive compositions containing the maleic-modified resin (I-M, II-M or III-M) are excellent in peeling strength at high temperatures (60°C).

Table 1

| Adhesive composition | Properties | Peel strength | Kg/2.5 cm |
|---|---|---|---|
| | | 23°C | 60°C |
| Novel composition containing | | | |
| I-M resin | | 13.2 | 3.3 |
| II-M resin | " | 13.4 | 3.1 |
| III-M resin | | 8.0 | 3.1 |
| Comparative composition containing | | | |
| I resin | | 8.7 | 0.6 |
| II resin | " | 14.2 | 0.6 |
| III resin | | 4.1 | 1.3 |
| Comparative resin-free composition (Resin-free) | | 13.6 | 0.9 |

The test for peel strength was made as follows.

Two pieces of cotton canvas No. 10 are coated, three times at an interval of one hour, with the adhesive composition on their surfaces to be bonded to each other. Fifteen minutes after the completion of the last coating, the two pieces so coated were together compressed with their coated surfaces facing to each other by the use of a hand roller (10 Kg) to obtain a bonded mass. The thus-obtained bonded mass after allowed to stand in a thermostatic room at 23°C for 48 hours, was tested for peel strength at 23°C and 60°C by peeling the pieces of the mass from each other at a peeling rate of 50 mm/min by the use of a tester for tensile strength. The peeling rate was measured according to ASTM D-903-49.

What is claimed is:

1. An adhesive composition comprising, by weight, (1) 1–100 parts of an acid-modified hydrocarbon resin selected from the group consisting of aliphatic hydrocarbon resins, aromatic hydrocarbon resins, and mixtures thereof, (2) 100 parts of polychloroprene, (3) 1–40 parts of a metal oxide and 0–5 parts of an anti-aging agent, (4) 0–100 parts of at least one supplemental resin, and (5) 100–1000 parts of a volatile organic solvent, the acid-modified resin (1) having been prepared by reacting 100 parts of a starting hydrocarbon resin having a softening point of about 100° to about 157°C, obtained by the polymerization of a cracked petroleum oil fraction selected from the group consisting of a fraction boiling at 20°–140°C, a fraction boiling at 140°–280°C, and mixtures thereof, with 0.1–30 parts of an unsaturated polybasic acid material selected from the group consisting of unsaturated polybasic acids and anhydrides thereof.

2. An adhesive composition according to claim 1, wherein the suppplemental resin is a member selected from the group consisting of alkylphenol resins, cumarone-indene resins, and petroleum resins.

3. An adhesive composition according to claim 1, wherein the unsaturated polybasic acid material is at least one member selected from the group consisting of maleic, citraconic, endomethylenetetrahydrophthalic and tetrahydrophthalic acids, and anhydrides thereof.

4. An adhesive composition according to claim 1, wherein the metal oxide is a member selected from the group consisting of magnesium, calcium and zinc oxides, and the anti-aging agent is a member selected from the group consisting of 2,6-ditertiary-butyl p-cresol, 2,2'-methylene bis(4-methyl-6-tertiary-butylphenol) and phenyl-$\beta$-naphthylamine.

5. An adhesive composition according to claim 1, wherein the volatile organic solvent is a member selected from the group consisting of toluene, xylene, carbon tetrachloride, ethyl acetate, n-hexane and mixtures thereof.

6. An adhesive composition according to claim 1, comprising, by weight, (1) about 20–60 parts of said acid-modified hydrocarbon resin, (2) about 100 parts of said polychloroprene, (3) 5–20 parts of the metal oxide and 1–3 parts of the anti-aging agent, (4) 0–60 parts of the supplemental resin and (5) 300–600 parts of the volatile organic solvent.

7. An adhesive composition according to claim 6, wherein the supplemental resin is a member selected from the group consisting of alkylphenol resins, cumarone-indene resins, and petroleum resins.

8. An adhesive composition according to claim 6, wherein the unsaturated polybasic acid material is a member selected from the group consisting of maleic, citraconic, endomethylenetetrahydrophthalic and tetrahydrophthalic acids, and anhydrides thereof.

9. An adhesive composition according to claim 6, wherein the metal oxide is a member selected from the group consisting of magnesium, calcium, and zinc oxides; and the anti-aging agent is a member selected from the group consisting of 2,6-ditertiary-butyl-p-cresol, 2,2'-methylene bis (4-methyl-6-tertiary-butylphenol) and phenyl-$\beta$-naphthylamine.

10. An adhesive composition according to claim 6, wherein the volatile organic solvent is a member selected from the group consisting of toluene, xylene, carbon tetrachloride, ethyl acetate, n-hexane, and mixtures thereof.

* * * * *